United States Patent [19]

Redfarn

[11] Patent Number: 4,645,782

[45] Date of Patent: Feb. 24, 1987

[54] PUTTY OR MASTIC

[75] Inventor: Cyril A. Redfarn, London, England

[73] Assignee: Dixon International Limited, Pampisford, England

[21] Appl. No.: 539,592

[22] Filed: Oct. 6, 1983

[51] Int. Cl.$^4$ .......................... C09K 21/14; C09D 5/34
[52] U.S. Cl. .................................. 523/179; 524/195; 524/503
[58] Field of Search .................. 523/179; 524/503

[56] References Cited

U.S. PATENT DOCUMENTS

| 3,090,764 | 5/1963 | Ellis | 523/179 |
| 4,210,725 | 7/1980 | Redfarn | 521/100 |
| 4,269,944 | 5/1981 | Redfarn | 521/100 |

FOREIGN PATENT DOCUMENTS 2095683A 10/1982 United Kingdom .

Primary Examiner—C. Warren Ivy
Attorney, Agent, or Firm—Irvin A. Lavine

[57] ABSTRACT

An intumescent putty or mastic is produced by admixing fine particles of solid intumescent material, polyvinyl butyral and a volatile solvent. The intumescent material can optionally be ground scrap intumescent door seals.

19 Claims, No Drawings

PUTTY OR MASTIC

The present invention relates to mastic or putty.

Materials are known which when exposed to elevated temperature intumesce or swell to form a voluminus mass capable of acting as a barrier or sealant to the fumes and smoke arising from a conflagration. Such materials are referred to herein as "intumescent materials".

It is known to provide intumescent materials between doors and windows and adjacent structures e.g. door frames and window frames, of a room, the intumescent material being applied to the doors and windows and/or the adjacent structures. It is also known to provide intumescent material in chinks or gaps between the door and window frames and the adjacent structures. In a conflagration, the intumescent material swells, fills and seals, preferably for at least one hour, existing gaps and gaps which form as a result of the heat between the door or window and the adjacent structure to inhibit spread of smoke and fumes past the door or window. Known intumescent materials are generally made from a slurry or paste which hardens to form the intumescent material.

Hitherto a substance capable of being used as a putty in the abovementioned existing gaps and chinks or around a heat-resistant glass window and such that when hardened would intumesce under conflagration conditions has not been available.

Accordingly, it is an object of the invention to provide a putty which will harden or set and will intumesce under conflagration conditions.

In accordance with the present invention, there is provided a composition suitable for use as a putty or mastic comprising, as a solid phase, fine solid particles of intumescent material or which when subjected to elevated temperature, as under fire conditions, from intumescent material, the fine particles being dispersed in a solution of a flexible film-forming adhesive polymer in a volatile solvent.

Preferably the particles of the solid phase comprise a carbonific and a spumific.

Preferably the particles comprise also an activator. The particles may furthermore comprise a binder.

The carbonific is a source of carbon char when the intumescent material is subjected to heat. It is the principal constituent of the foam that is formed when the intumescent material is exposed to elevated temperatures. Polyhydroxy compounds such as mono-, di and tri-pentaerythritols and starch are examples of carbonifics.

The spumific decomposes under fire conditions and releases gases which cause the carbon char to expand. Dicyandiamide and guanidine are examples of spumifics.

The activator is a material that promotes the decomposition of the carbonific and the spumific. Monoammonium phosphate is an example of an activator.

The binder may be an amino resin, such as melamine formaldehyde resin or urea-formaldehyde resin. The amino resin also acts to some extent as a carbonific and a spumific.

The particles may comprise a polymer (homopolymer or copolymer) of vinyl acetate as additional binder.

Thus the particles may comprise a polyhydroxy compound, dicyandiamide or guanidine, an ammonium phosphate, melamine formaldehyde or urea-formaldehyde resin and vinyl acetate polymer.

The dicyandiamide or guanidine may be in free form or may be in combined form serving to crosslink the amino resin or may be partly in free form and partly serving to crosslink the amino resin.

The fine particles may each substantially contain an amount of each of the ingredients of the intumescent material or individual particles of the fine particles may comprise one or more (but not all) of the ingredients of the intumescent material.

The composition of the invention is preferably of a stiff pasty consistency similar to that of ordinary glaziers' putty and the composition is such that, on exposure to air, it will harden to a solid coherent mass.

By "fine particles" we mean particles preferably having a size less than 125 microns, more preferably less than 75 microns.

The stretchable film-forming adhesive polymer is preferably polyvinyl butyral.

The melamine formaldehyde resin may be crosslinked and/or the composition may contain a crosslinking agent. The melamine formaldehyde resin may be crosslinked by and/or the composition may contain dicyandiamide or guanidine, both of which are spumifics.

The malamine formaldehyde resin may be crosslinked before mixing with the solution of the flexible stretchable film-forming polymer in the volatile solvent. Alternatively and preferably the melamine formaldehyde resin is uncrosslinked or substantially uncrosslinked when mixed with the solution of the stretchable film-forming polymer, a crosslinking agent such as dicyandiamide or guanidine is also mixed with the solution and melamine-formaldehyde resin accordingly may become crosslinked on or after mixing with the solvent.

The ammonium phosphate is preferably monoammonium dihydrogen phosphate.

The polyhydroxy compound is preferably pentaerythritol or a sugar.

The volatile solvent may be isopropyl alcohol, methyl ethyl ketone or diacetone alcohol or a mixture thereof, optionally together with 1,1,1-trichloroethane. The presence of 1,1,1-trichloroethane, which is of low toxicity, reduces the fire hazard of the solvent.

The composition hardens by evaporation of the solvent. The trowellable time of the composition depends on the rate of evaporation of the solvent, the trowellable time increasing as the rate of evaporation decreases.

Where the solvent comprises isopropyl alcohol, to retard the rate of evaporation of the solvent, preferably the solvent includes diacetone alcohol, methyl oxitol or other compound miscible with the isopropyl alcohol but less volatile than the isopropyl alcohol. It is preferable to use diacetone alcohol because, like isopropanol, it is reported to be of low toxicity.

Castor oil or other plasticizing agent may be incorporated into the composition to improve the flexibility and damp resistance of the hardened composition.

The solid phase of the composition of the invention is expediently made into fine particles by ball milling of the solid ingredients, either individually or together. To inhibit particles of the material being ball-milled from sticking together, solid $CO_2$ and/or a small amount of finely divided activated silica as an anti-caking agent may be added to the material.

Alternatively the fine particles are produced by disc or hammer milling.

In preparing the composition according to the invention, preferably the solid phase is provided by a mixture of uncrosslinked melamine formaldehyde resin, a crosslinking agent, an ammonium phosphate, a polyhydroxy compound and polyvinyl acetate. When the composition is subjected to elevated temperature, as under fire conditions, the ingredients of the solid phase, if they have not already done so, react together to yield intumescent material.

The solid phase of the composition may instead be made from scrap intumescent material originally prepared, for example, for intumescent seals for doors. The scrap material has to be rendered suitably fine and relatively coarse particles, such as wood flour, removed. The scrap materials may contain setting agent, e.g. plaster of Paris.

Alternatively specially prepared intumescent material may be used to prepare the fine particulate material.

The invention is illustrated by the following examples.

EXAMPLE 1A

A mix was prepared from the following ingredients:
ammonium dihydrogen phosphate: 42 g
water-dispersible (i.e. uncured):
melamine formaldehyde resin powder: 38 g
dicyandiamide: 20 g
pentaerythritol: 8 g
Vinapol 1070 (water-dispersible polyvinyl acetate powder): 1.5 g The mix was mixed with water (24 g) to give a paste. The paste was spread out in a layer about 1 cm thick in a tray and dried at 100° to 110° C. until brittle and crumbly. (Heating above 130° C. is liable to cause the material to intumesce). The dry crumb was then ground to powder (i.e. fine particles of size less than 75 microns) in a ball mill.

Vinapol 1070 is a vinyl acetate copolymer of VeoVa 10 which is the vinyl ester of Versatic 10, a synthetic saturated monocarboxylic acid of highly branched structure containing ten carbon atoms. Its structure may be represented as:

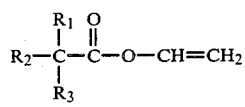

where $R_1$, $R_2$ and $R_3$ are straight chain alkyl groups at least one of which is always methyl.

A polyvinyl butyral solution was made up from the following components:
Butvar B79 (polyvinyl butyral): 15 parts by weight
castor oil: 5 parts by weight
isopropyl alcohol: 72 parts by weight
diacetone alcohol: 8 parts by weight The fine intumescent particulate material was mixed with the polyvinyl butyral solution in the approximate proportions 100 parts by weight intumescent material to 40 parts by weight of the solution to give a paste of conventional putty-like consistency.

Butvar B79 typically has a weight average molecular weight of 34,000-38,000, a solution viscosity of 100-200 cp and a butyral content expressed as % polyvinyl butyral of approximately 88% and a hydroxyl content expressed as % polyvinyl alcohol of 9.0-13.0%.

EXAMPLE 1B

Example 1A was repeated but modified in that the polyvinyl butyral solution was made up using 37 parts by weight of isopropyl alcohol and 43 parts by weight of 1,1,1-trichloroethane instead of isopropyl alcohol and diacetone alcohol in the amounts stated in Example 1A.

EXAMPLE 1C

Example 1A was repeated but modified in that the polyvinyl butyral solution was made up using 28 parts by weight Butvar B79, 12 parts by weight castor oil, 73 parts by weight of diacetone alcohol and 83 parts by weight of 1,1,1-trichloroethane.

EXAMPLE 2

In this example, scrap intumescent material was used. The scrap material had been originally prepared for use in intumescent fire seals for doors.

The scrap material was obtained as waste from the process described in Example 1 of our British patent application No. 4653/77 (British Pat. No. 1601131), from the following ingredients.
monoammonium dihydrogen phosphate: 4200 g
water-dispersible melamine formaldehyde resin powder: 3800 g
dicyandiamide: 2000 g
pentaerythritol: 800 g
Vinapol 1070: 150 g
wood flour (80 mesh): 250 g
plaster of Paris: 1100 g
water: 2400 g The ingredients were mixed to form a slurry, which was put into holder strips and allowed to harden. Hardened excess slurry was the scrap used in the present example.

The scrap material was roughly broken up and dried at elevated temperature (100°-110° C.) until brittle and crumbly. The material was then reduced to powder by ball milling with anti-caking agent (precipitated silica) present and sieved through a 75 micron mesh sieve, which removed the wood flour. (Excessive amounts of anti-caking agent tend to reduce the degree of intumescence of the putty prepared.)

The powder material was then mixed with a polyvinylbutyral solution to form putty. The relative proportions of the powder and the polyvinylbutyral solution and the composition of the polyvinylbutyral solution were as described in Example 1.

The putty prepared in Examples 1A, 1B, 1C and 2 could be worked into a gap and finished off with a putty knife or spatula. After hardening in air and on exposure to temperatures such as would occur in the gaseous combustion products of a conflagration, the putty puffed to about 5 times its original thickness and constituted an effective seal.

EXAMPLE 3

A dry mix of the following ingredients was prepared:
monoammonium dihydrogen phosphate: 4200 g
water-dispersible melamine formaldehyde resin powder: 3800 g
dicyandiamide: 2000 g
pentaerythritol: 800 g
Vinapol: 150 g
(Vinapol is polyvinyl acetate powder)

The dry mix was ball milled with solid $CO_2$ and a small amount of activated silica to a powder having a particle size of less than 75 microns. The amount of activated silica was about 2% by weight based on the weight of the dry mix.

A solution of polyvinyl butyral in isopropyl alcohol was also prepared. This solution consisted of:

Butvar B79 (polyvinyl butyral): 15 parts by weight
castor oil: 5 parts by weight
isopropyl alcohol: 72 parts by weight
diacetone alcohol: 8 parts by weight 30 parts by weight of the ball milled powder was mixed with 13 parts by weight of the polyvinyl butyral solution to give a smooth putty.

The putty spread well with a wet knife.

After standing exposed to the atmosphere for a week, the spread putty had set and intumesced well on heating to give a voluminous coherent mass.

I claim:

1. A composition suitable for use as a putty or mastic comprising, a substantially uniformly dispersed solid phase comprising fine particles of solid intumescent material and a continuous phase comprising a solution of polyvinyl butyral in a volatile solvent therefor.

2. A composition according to claim 1, wherein the solid phase comprises a carbonific and a spumific.

3. A composition according to claim 2 wherein the solid phase further comprises an activator for promoting the decomposition of said carbonific and said spumific.

4. A composition according to claim 1, wherein the solid phase further comprises a binder in particulate form.

5. A composition according to claim 2, wherein the carbonific is a polyhydroxy compound.

6. A composition according to claim 2, wherein the spumific is dicyandiamide or guanidine.

7. A composition according to claim 3, wherein the activator is an ammonium phosphate.

8. A composition according to claim 4, wherein the binder comprises melamine formaldehyde resin.

9. A composition according to claim 4, wherein the binder further comprises acetate polymer as additional binder.

10. A composition according to claim 1, further comprising a plasticizing agent for said polyvinyl butyral.

11. A composition according to claim 1, wherein the fine particles have a size less than the 125 microns.

12. A composition according to claim 11, wherein the particles have a size less than 75 microns.

13. A composition according to claim 1, wherein the solvent comprises 1,1,1-trichloroethane.

14. A composition according to claim 8, wherein the melamine formaldehyde resin is crosslinked and/or the composition contains a crosslinking agent.

15. A composition according to claim 8, wherein the melamine formaldehyde resin is crosslinked by and/or the composition contains dicyandiamide or guanidine as crosslinking agent.

16. A composition according to claim 7, wherein the ammonium phosphate is monoammonium dihydrogen phosphate.

17. A composition according to claim 5, wherein the polyhydroxy compound is pentaerythritol or a sugar.

18. A composition according to claim 1, wherein the solvent includes one or more of diacetone alcohol, methyl ethyl ketone, methyloxitol and isopropyl alcohol.

19. A method of making a composition according to claim 1, comprising mixing fine particles of a carbonific, a spumific, an activator and a binder with a solution of polyvinyl butyral in a volatile solvent therefor.

* * * * *